United States Patent [19]

Kumakura

[11] Patent Number: 5,408,292
[45] Date of Patent: Apr. 18, 1995

[54] VISUAL AXIS DETECTING DEVICE

[75] Inventor: Toshiyuki Kumakura, Tokyo, Japan

[73] Assignee: Canon Kabushiki Kaisha, Tokyo, Japan

[21] Appl. No.: 114,360

[22] Filed: Sep. 1, 1993

[30] Foreign Application Priority Data

Sep. 7, 1992 [JP] Japan .................. 4-262747

[51] Int. Cl.⁶ .............. G03B 13/02; A61B 3/14; H04N 5/335
[52] U.S. Cl. .................. 354/410; 348/317; 351/210
[58] Field of Search .............. 354/62, 410, 219; 358/213.19; 348/297, 317-321; 351/210

[56] References Cited

U.S. PATENT DOCUMENTS

| | | | |
|---|---|---|---|
| 4,320,413 | 3/1982 | Takemura | 358/44 |
| 4,574,314 | 3/1986 | Weinblatt | 358/227 |
| 4,836,670 | 6/1989 | Hutchinson | 351/210 |
| 5,036,347 | 7/1991 | Tsunekawa et al. | 354/400 |
| 5,231,674 | 7/1993 | Cleveland et al. | 382/6 |

FOREIGN PATENT DOCUMENTS 61-172552 8/1986 Japan .
1-241511 9/1989 Japan .
2-000005 1/1990 Japan .

*Primary Examiner*—W. B. Perkey
*Attorney, Agent, or Firm*—Fitzpatrick, Cella, Harper & Scinto

[57] ABSTRACT

An image processing apparatus for visual axis detection in which a frame transfer type CCD is used as an area sensor for converting an incident eyeball image into an electrical signal. Use of the frame transfer type LCD will widen the light receiving area on the surface of the CCD and enhance the numerical aperture, as to well as greatly enhance the probability of detection of Purkinje's image and enhance the sensitivity to the infrared range to thereby make the Purkinje's image detectable by a smaller quantity of illumination.

6 Claims, 5 Drawing Sheets

VISUAL AXIS DETECTING DEVICE

BACKGROUND OF THE INVENTION

1. Field of the Invention

This invention relates to an image processing apparatus incorporated in a camera using silver salt film, a video camera or the like, and provided with a visual axis detecting device including an area sensor (CCD) for detecting a photographer's eyeball and an area sensor for converting an incident image into an electrical signal.

2. Related Background Art

In recent years, there has been proposed a visual axis detecting device by which, in order to detect a photographer's visual axis, the photographer's eyeball is illuminated by an infrared light emitting diode (hereinafter referred to as the IRED) and the angle of rotation in a direction in which the eyeball is seeing is calculated from the position of a reflected image on the cornea of the eyeball by the IRED (which reflected image is called Purkinje's image) and the position of the center of the pupil found from the boundary (edge, which is a characteristic point) between the infrared-illuminated iris and the pupil, whereby at what position on the finder image of a camera the photographer is looking, is discriminated. Such a detecting device is proposed in U.S. application Ser. No. 07/888,495.

As a device of this kind, there is known, for example, one in which it is incorporated in a single-lens reflex camera provided with an auto focus device and the distance measuring point of the auto focus device is selected on the basis of visual axis information from the visual axis detecting device and auto focusing is effected at that distance measuring point.

In the above-described example of the prior art, however, what type of area sensor is best suited as an area sensor for obtaining eyeball image data has been unknown.

As the type of CCD (charge coupled device) area sensor popular in video cameras and the like, use has heretofore been made of a CCD of the interline (hereinafter referred to as IT) type. A conceptional view of the IT type CCD as it is seen from a surface near a certain picture element on the sensor chip surface thereof is designed as follows.

FIG. 9 of the accompanying drawings shows four picture elements picked out, and hatched portions are opening portions, i.e., areas A in which light reception is effected, and neighboring portions B are the areas of a CCD for vertical transfer.

Charges received and accumulated in the areas A (light receiving portions) are shifted to the areas B (CCD portions for vertical transfer) immediately adjacent to the areas A by operation of an electrode generally called a shift electrode, and are downwardly vertically transferred in conformity with the reading-out of a CCD image signal.

In this way, the light receiving portions and the CCD portions for vertical transfer are two-dimensionally disposed and, therefore, the numerical aperture of the light receiving portion in a picture element becomes small, and generally is a value of about 30%. Therefore, the corneal reflected image of the IRED, i.e., Purkinje's image, becomes considerably small on the area sensor and thus, comes into an insensitive zone on the area sensor, and this gives rise to a problem that the Purkinje's image cannot be detected.

Accordingly, an area sensor of great numerical aperture is desirable as the area sensor in the above-described visual axis detecting device.

Also, as a countermeasure for the saturation of the light receiving portions in the above-described IT type CCD, vertical type overflow drain structure for permitting overflowed charges to escape to a substrate so as not to come into the CCD portions for vertical transfer and the picture elements adjacent thereto is adopted. However, due to this vertical type overflow drain structure, rays of long wavelength light like infrared light which arrive at even the deep portion of the substrate are not effectively utilized, and this leads to a problem that sensitivity to infrared light is reduced.

Further, generally in a method of introducing eyeball data in a visual axis detecting device, control is effected for an area sensor in the flow of accumulation, reading-out and processing. In this case, an inexpensive A/D converter takes much A/D conversion time and thus, control is effected with a time distribution of about several ms for accumulation and several hundreds of ms for reading-out, and the reading-out time is much longer than the accumulation time.

When the use of the IT type CCD is considered at such a time, the reading-out rate is slow after the charges are shifted to the CCD portions for vertical transfer after the termination of accumulation and therefore, the leakage of light from the light receiving portions into the CCD portions for vertical transfer occurs. This is called smear, and the amount of this cannot be neglected, and this leads to a problem that image data are deteriorated.

Also, an area sensor having high sensitivity to infrared light is desirable as the area sensor in the above-described visual axis detecting device, because it is necessary to effect detection by the use of infrared illumination without making the photographer conscious of the illumination.

SUMMARY OF THE INVENTION

It is a first object of the present invention to provide a visual axis detecting device in which a light receiving area is widened on the surface of a CCD and the numerical aperture is enhanced to thereby greatly enhance the probability of detection of Purkinje's image and also enhance sensitivity to the infrared range and the Purkinje's image can be detected by a smaller quantity of illumination.

It is a second object of the present invention to provide an image processing apparatus which can prevent the deterioration of image data even when the reading-out time of an accumulation signal becomes longer than an accumulation time.

The present invention is designed to use a frame transfer type CCD as an area sensor for converting an incident eyeball image into an electrical signal.

Also, the present invention is designed to use a frame transfer type CCD as an area sensor for converting in image incident through an objective lens into an electrical signal.

DESCRIPTION OF THE PREFERRED EMBODIMENT

Figure 1:
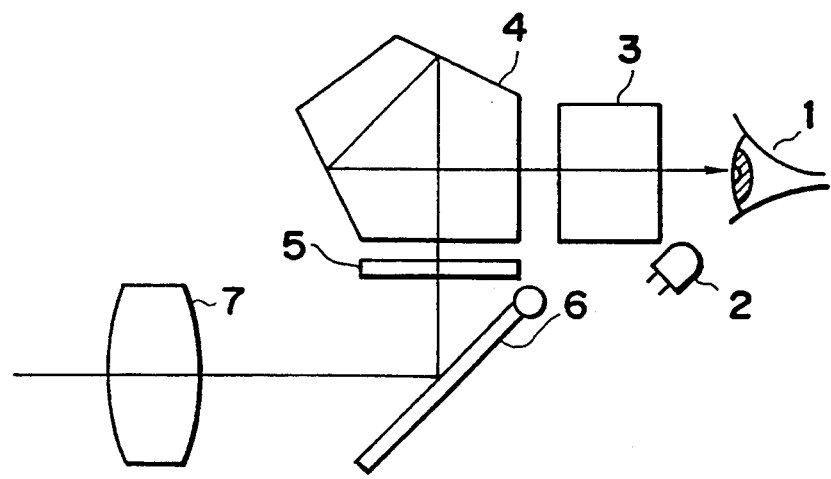
FIG. 1 is a mechanism view of portions of an embodiment of the present invention applied to a single-lens reflex camera as they are seen sideways.

The present invention will hereinafter be described in detail with respect to an embodiment thereof shown in the drawings.

Figure 2:
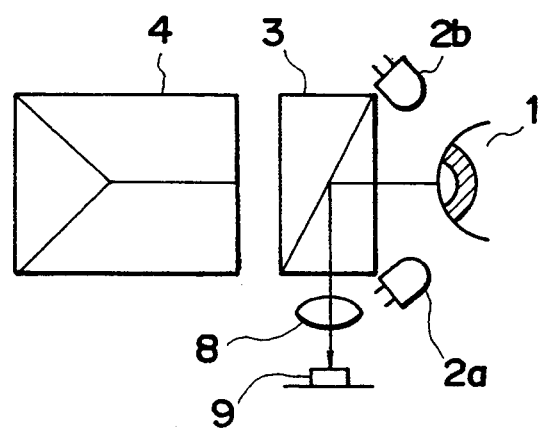
FIG. 2 is a mechanism view of portions of the embodiment of the present invention applied to a single-lens reflex camera as they are seen from above.

FIGS. 1 and 2 show an embodiment of the present invention, and more particularly show the construction of a visual axis detecting device applied to a single-lens reflex camera. FIG. 1 is a view of the single-lens reflex camera as it is seen sideways, and FIG. 2 is a view thereof as it is seen from above.

In FIG. 1, the reference numeral 1 designates a photographer's eyeball, the reference numeral 2 denotes an IRED for infrared illumination, the reference numeral 3 designates a dichroic prism, the reference numeral 4 denotes a pentagonal prism, the reference numeral 5 designates a screen, the reference numeral 6 denotes a quick return mirror, and the reference numeral 7 designates a photo-taking lens.

In FIG. 2, the reference characters 2a and 2b denote IREDs for infrared illumination which are the same as the IRED 2 in FIG. 1. The reference numeral 8 designates an eyeball image, and the reference numeral 9 denotes a lens for forming the eyeball image on a frame transfer (hereinafter referred to as FT) type CCD which is an area sensor.

The dichroic prism 3 has the function of passing therethrough the object light from the pentagonal prism 4 and directing it to the photographer's eye and also reflecting only the infrared range of the reflected light reflected by the infrared-illuminated eyeball 1 by the surface of the dichroic prism 3, and causing the infrared range to enter the CCD area sensor 9.

In the above-described construction, the ray of light of the object image to the photographer enters the photographer's eyeball 1 via the photo-taking lens 7, the quick return mirror 6, the screen 5, the pentagonal prism 4 and the dichroic prism 3. The object image is once formed on the screen 6, and the photographer looks at the screen. This is lentatively expressed as looking at the finder image.

The detection of the obtainment of eyeball image data will now be described with reference to FIG. 2. The IREDs 2a and 2b are first turned on at the eyeball image data obtainment timing and illuminate the eyeball 1. Thereupon, the reflected light from the eyeball 1 is reflected by the dichroic prism 3, and is imaged on the FT type CCD 9 via the lens 8.

Figure 3:
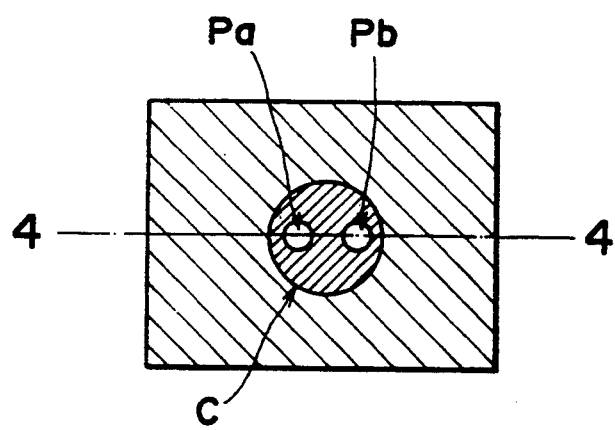
FIG. 3 is a view for illustrating data on an eyeball.

FIG. 3 shows the eyeball image obtained at this time.

In FIG. 3, the reference characters Pa and Pb designate the Purkinje's images of the corneal reflected images by the IREDs 2a and 2b, respectively. The letter C denotes the boundary area between the infrared-illuminated iris and pupil, and the interior of the area C corresponds to the pupil.

Figure 4:
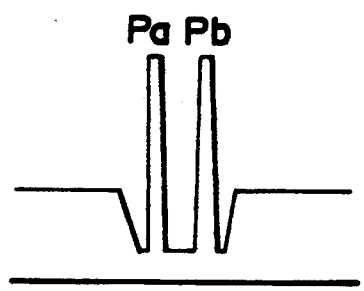
FIG. 4 shows the amount of signal when seen along the plane A—A' of FIG. 3 in the state of FIG. 3.

It is FIG. 4 that shows the cross-section along line A—A' in FIG. 3, i.e., the then amount of signal on the FT type CCD 9. The Purkinje's images Pa and Pb exhibit the highest intensity, the iris exhibits the medium intensity, and the pupil exhibits the lowest intensity.

Figure 5:
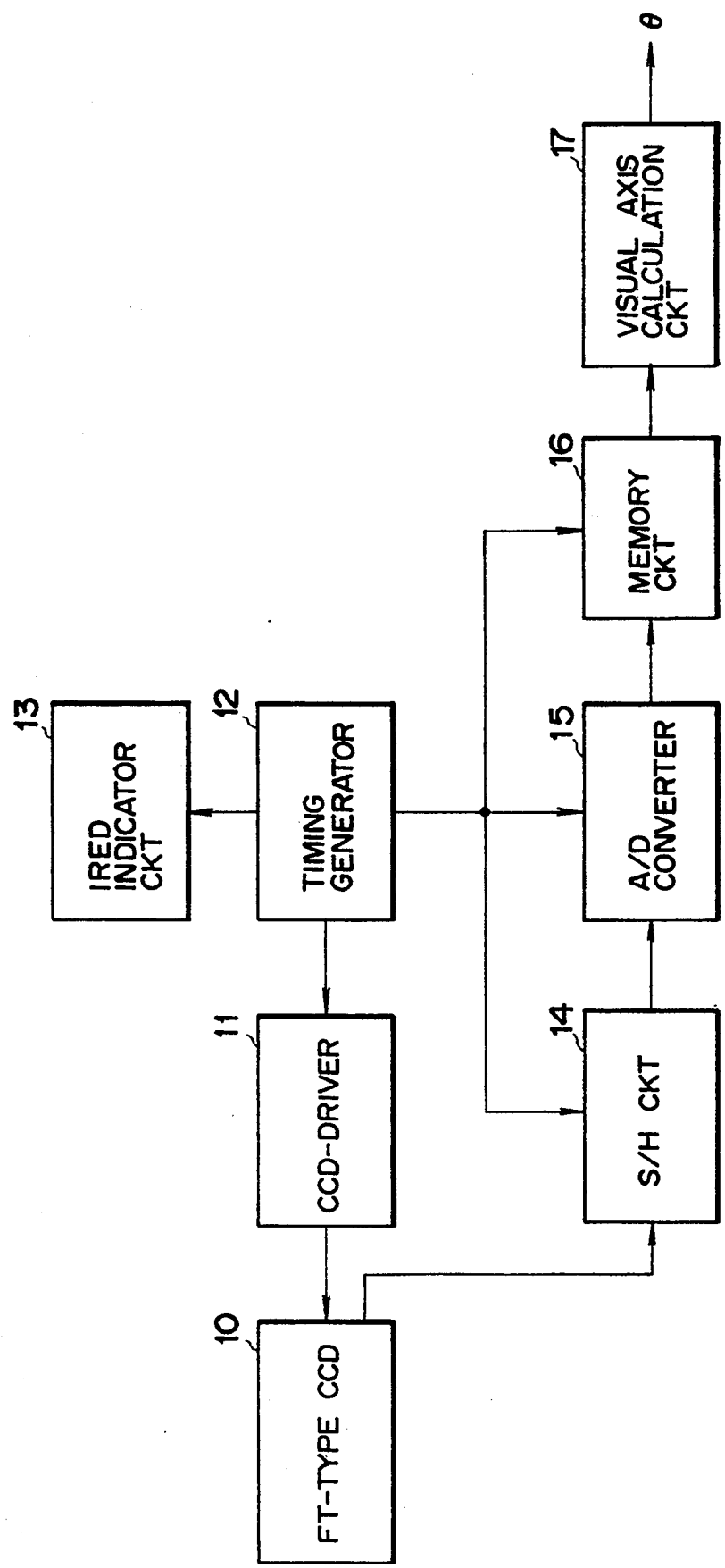
FIG. 5 is a block diagram showing the construction of a visual axis detecting device which is an embodiment of the present invention.

FIG. 5 is a block diagram showing the circuit construction of the visual axis detecting device having the above-described mechanism. In FIG. 5, the reference numeral 10 designates an FT type CCD (corresponding to the above-described FT type CCD 9) as an area sensor, the reference numeral 11 denotes a CCD driver for driving the FT type CCD 10, the reference numeral 12 designates a timing generator, the reference numeral 13 denotes an IRED indicator circuit for turning on the IREDs 2a and 2b, the reference numeral 14 designates a sample hold (S/H) circuit for holding an analog image signal from the FT type CCD 10, the reference numeral 15 denotes an A/D converter, the reference numeral 16 designates a memory circuit, and the reference numeral 17 denotes a visual axis calculation circuit for calculating visual axis information $\theta$.

The timing generator 12 transmits the driving timing of the FT type CCD 10 to the CCD driver 11 and also causes the IRED indicator circuit 13 to generate the turn-on timing of the IREDs 2a and 2b (this turn-on timing is such timing that the FT type CCD 10 is turned on only during the accumulating state thereof). Also, the timing generator 12 transmits each sample hold timing of the S/H circuit 14 and the image data introduction timing of the A/D converter 15 to the memory circuit 16.

As the image data of the eyeball 1, the amount of signal as seen in FIG. 3 is stored in the memory circuit 16. On the basis of the eyeball image data stored in the memory circuit 16, the visual axis calculation circuit 17 calculates the angle of rotation of the eyeball 1.

The process of calculating the angle of rotation of the eyeball 1 by the visual axis calculation circuit 17 is known and therefore will be briefly described below.

Describing it with reference to FIG. 3, the central positions of the Purkinje's images Pa and Pb are calculated from these Purkinje's images, and then the center of the pupil is calculated from the boundary area C between the pupil and the iris, and the angle of rotation obtained thereby is used for the selection of the distance measuring point of an auto focus device, not shown.

The construction of the FT type CCD 10 will now be described with reference to FIG. 6.

Figure 6:
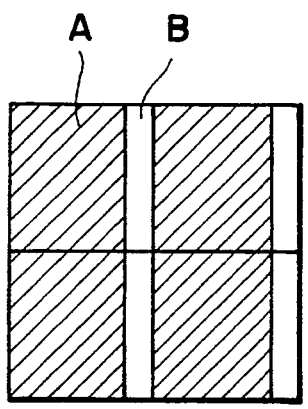
FIG. 6 is a view for illustrating the picture elements of an FT type CCD shown in FIG. 5.

In FIG. 6, an area A is an opening portion as a light receiving area, and an area B is a lateral type overflow drain area as a countermeasure for the saturation of the light receiving area which is adopted in the case of an FT type CCD. In the case of the FT type CCD, the lateral type overflow drain is adopted, whereby the numerical aperture corresponding thereto is reduced, but as compared with the IT type CCD as the conventionally used CCD area sensor shown in FIG. 9, a considerably great numerical aperture can be secured.

Specifically, the numerical aperture, which has heretofore been about 30% to the area of a picture element as previously described, can be increased to about 70–80%.

Figure 9:
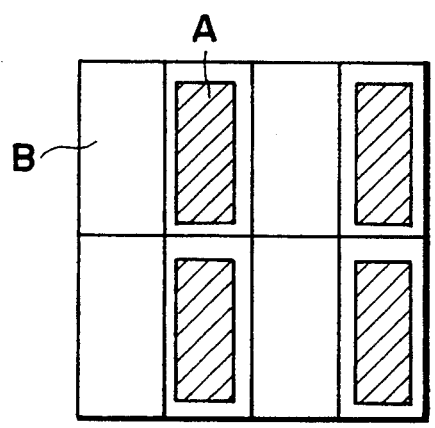
FIG. 9 is a view for illustrating the picture elements of an IT type CCD used in a visual axis detecting device according to the prior art.

In the case of the IT type CCD, a CCD portion for vertical transfer is provided in each picture element discretely from the light receiving area, as shown in FIG. 9, and moreover, from the equilibrium with the amount of charges to be handled, the area of the CCD portion cannot be made very small and thus, from the viewpoint of the numerical aperture, a great loss will result. On the other hand, in the FT type CCD 10, the transfer method thereof can make the light receiving area equal to the vertical transfer CCD area and therefore, a great numerical aperture can be obtained as described above.

The Purkinje's image by the IRED is considerably small and is of the size of about one picture element on the area sensor, and the farther the photographer's eyeball position becomes from the finder, the Purkinge's image becomes smaller. At such a time, in the IT type CCD as seen in FIG. 9, the Purkinje's image may lie at the position of the CCD portion B for vertical transfer, and in such case, the detection of the Purkinje's image becomes impossible, while in the FT type CCD 10 used in the present embodiment, there is no large insensitive zone like that and therefore, the Purkinje's images Pa and Pb are always detectable.

Also, in the FT type CCD 10, the lateral type overflow drain structure is adopted, whereby with respect to the quantity of light incident on the light receiving area, the absorption of the component of the infrared range does not occur as in the IT type CCD, and the infrared component can also be utilized effectively and thus, the FT type CCD can be said to be high in sensitivity to infrared light.

Figure 7:
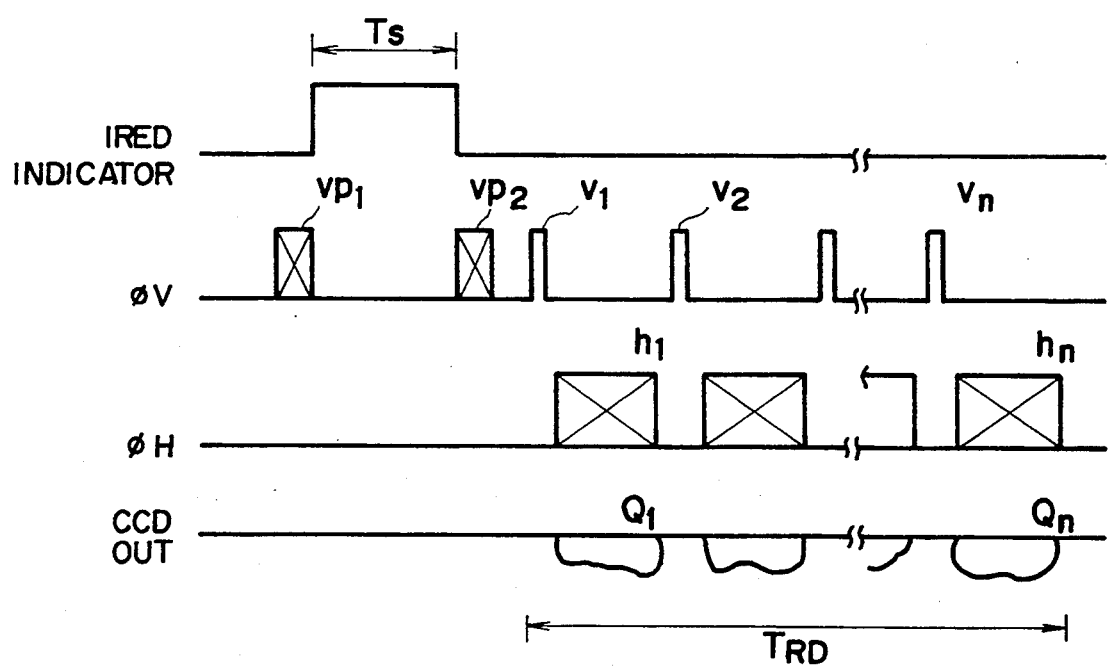
FIG. 7 is a timing chart showing an example of the driving timing of the FT type CCD shown in FIG. 5.

FIG. 7 is a general driving timing chart of the above-described FT type CCD 10.

The turn-on timing of the IRED is the time of the accumulation state to the equal area sensor. $\phi v$ means the vertical transfer pulse of the FT type CCD. vp1 is the pulse train of $\phi v$.

Figure 8:
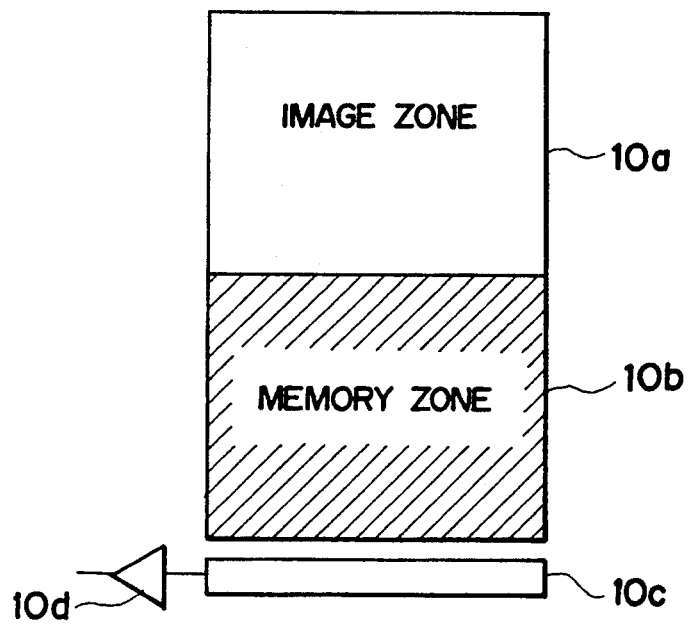
FIG. 8 shows the structure of the FT type CCD shown in FIG. 5.

The FT type CCD10, as shown in FIG. 8, is comprised of an image zone 10a, a memory zone 10b, a horizontal transfer CCD portion 10c and an output amplifier 10d.

vp1 designates a plurality of pulse trains, and the charges in the image zone is cleared by each train. Thereafter, the FT type CCD assumes a charge accumulating state. Then, after an accumulation time (Ts), charge transfer from the image zone to the memory zone is effected a vertical transfer pulse train (vp2). Thereafter, one shot of drive is applied to the pulse V1, whereby the pulse is dropped into the horizontal transfer CCD portion 10c, and a horizontal transfer pulse $\phi_H$ is driven by h1 (pulse train), whereby the output of CCD image data is obtained as indicated by Q1. This is the manner in which an output per line is put out, and this is repeated by the number n of lines of the area sensor.

As previously described, the whole reading-out time (corresponding to $T_{RD}$ in FIG. 7) determined by the conversion time of the A/D converter 15 is longer than the accumulation time Ts, but in the case of the FT type CCD, the memory zone 10b is shielded from light and therefore, after the transfer from the image zone 10a to the memory zone 10b, the memory zone is not affected by the light from the length of the reading-out time, and the smear during reading-out as seen in the IT type CCD does not occur in principle.

In the FT type CCD 10, there is an amount of smear determined by the driving timing speed and the accumulation time during the transfer from the image zone 10a to the memory zone 10b, but if the driving of the pulses vp1 and vp2 is effected at a high speed, this amount of smear can be made relatively small and its influence upon the image data is small.

The IREDs 2a and 2b are turned on only during the accumulating state and are not turned on during reading-out, but yet the photographer's eyeball 1 is exposed to external light and the infrared light component in the external light comes into the FT type CCD 10 as the area sensor even during reading-out and therefore, a countermeasure therefor is necessary.

According to the present embodiment, in the visual axis detecting device, the frame transfer (FT) type CCD is adopted in lieu of the interline (IT) type CCD and therefore, it becomes possible to widen the light receiving area on the surface of the area sensor, enhance the numerical aperture and enhance the probability of detection of the Purkinje's images, and it also becomes possible to enhance the sensitivity to the infrared range by the visual axis detecting device in which infrared illumination is effected, and detect the Purkinje's images by a smaller quantity of illumination.

The present embodiment has been described with respect to an example in which an FT type CCD is adopted in the visual axis detecting device, whereas the present invention is not restricted thereto, but in other optical apparatus, i.e., an ordinary image processing apparatus, the FT type CCD is adopted under such condition of use in which the reading-out time of the area sensor is long as compared with the accumulation time, whereby it becomes possible to prevent the deterioration of image data.

As described above, according to the present invention, a frame transfer type CCD is used as an area sensor for converting the incident eyeball image into an electrical signal.

Consequently, it is possible to widen the light receiving area on the surface of the CCD and enhance the numerical aperture and greatly enhance the probability of detection of the Purkinje's images. Further, it becomes possible to enhance the sensitivity to the infrared range and detect the Purkinje's images by a smaller quantity of illumination.

Also, a frame transfer type CCD is used as an area sensor for converting an image incident through the objective lens into an electrical signal.

Consequently, it becomes possible to prevent the deterioration of image data even when, as compared with the accumulation time, the reading-out time for the accumulation signal is long.

What is claimed is:

1. A device for detecting an observer's visual axis, comprising:
   illuminating means for illuminating the observer's eyeball with infrared light;
   frame transfer type solid state image pickup means for converting infrared light reflected from the eyeball into an electrical signal; and
   signal processing means for detecting the observer's visual axis on the basis of said electrical signal.

2. A device according to claim 1, wherein the reading-out time for accumulated charges is longer than the accumulation time of said solid state image pickup means.

3. A device according to claim 1, wherein said signal processing means determines a target point from a corneal reflected image by said illuminating means and a characteristic point of the eyeball.

4. An image processing apparatus having an objective lens, said apparatus comprising:

frame transfer type solid state image pickup means for converting an image passing through said objective lens into an electrical signal; and processing means in which a reading-out time for accumulated charges is longer than a charge accumulation time of said solid state image pickup means, and in which signal processing is effected on the basis of the read-out charges is effected.

5. An image processing apparatus according to claim 4, wherein said objective lens forms the image of the surface of an eyeball.

6. An image processing apparatus according to claim 5, wherein said signal processing means provides a signal which corresponds to the visual axis.

* * * * *

UNITED STATES PATENT AND TRADEMARK OFFICE
CERTIFICATE OF CORRECTION

PATENT NO. : 5,408,292
DATED : April 18, 1995
INVENTOR(S) : KUMAKURA

It is certified that error appears in the above-indentified patent and that said Letters Patent is hereby corrected as shown below:

<u>At [57] Abstract</u>, line 6

"as to well as" should read --as well as to--.

<u>Column 2</u>

Line 61, "in" should read --an--.

<u>Column 3</u>

Line 59, "lentatively" should read --tentatively--.

<u>Column 5</u>

Line 44, "is" should read --are--.

<u>Column 8</u>

Line 2, "charges is effected." should read --charges--.

Signed and Sealed this

Eighth Day of August, 1995

Attest:

BRUCE LEHMAN

*Attesting Officer*     *Commissioner of Patents and Trademarks*